No. 770,325. PATENTED SEPT. 20, 1904.
E. J. SISK.
NUT LOCK.
APPLICATION FILED JAN. 21, 1903.
NO MODEL.
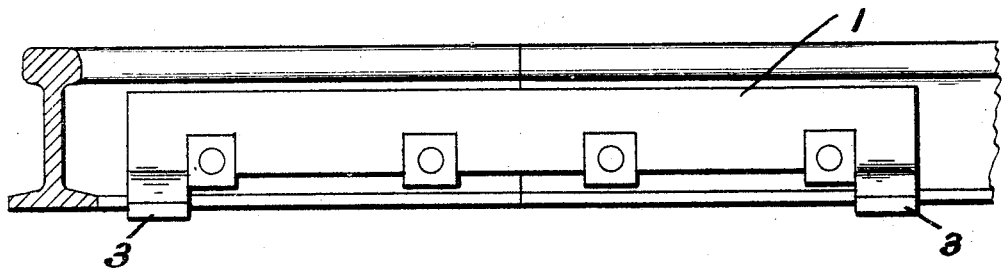
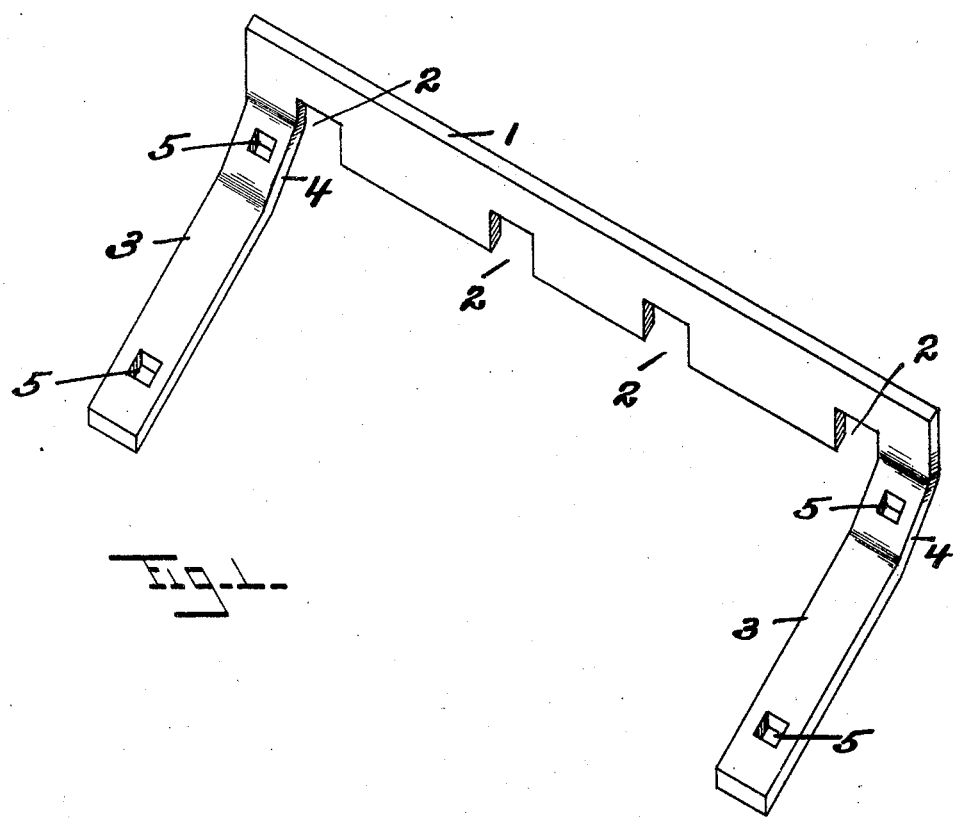
Witnesses.
J. O. Lejon
William O'Brien
Inventor.
Edward J. Sisk
by George E. Hall
Attorney.

No. 770,325. Patented September 20, 1904.

UNITED STATES PATENT OFFICE.

EDWARD J. SISK, OF NEW HAVEN, CONNECTICUT.

NUT-LOCK.

SPECIFICATION forming part of Letters Patent No. 770,325, dated September 20, 1904.

Application filed January 21, 1903. Serial No. 139,917. (No model.)

*To all whom it may concern:*

Be it known that I, EDWARD J. SISK, a citizen of the United States, residing at New Haven, in the county of New Haven and State of Connecticut, have invented certain new and useful Improvements in Nut-Locks, of which the following is a specification, reference being had therein to the accompanying drawings.

My invention relates to new and useful improvements in nut-locks, and has especial reference to a lock for holding the nuts upon fish-plate bolts against movement.

It is the object of my invention, among other things, to construct a device of this character which can be economically constructed and which will effectually prevent the rotation of the nuts and also provide a brace for the rails.

To these and other ends my invention consists in the nut-lock having certain details of construction, as hereinafter described, and more particularly pointed out in the claim.

Referring to the drawings, in which like numerals designate like parts in both figures, Figure 1 is a perspective view of my device complete; and Fig 2 is a side view thereof, showing its mode of attachment.

In carrying out my invention I provide a bar having notches arranged therein, so as to engage the nuts and terminating at either end in arms which are provided with spike-holes.

In the drawings, the numeral 1 designates the body portion of the device, having a plurality of notches 2 therein, which notches can be of course arranged in any convenient or desired positions in relation to each other. Projecting laterally therefrom and at both ends thereof are the arms 3 3, having the spike-holes 5 therethrough. Said arms are at substantially a right angle to the body portion, but joined to said body portion by an angular portion 4 to permit the arms to pass over the edge of the car-rail.

My device is attached after the fish-plates have been placed in position and the nuts tightened upon the bolts, with the notches 2 substantially surrounding the said nuts upon three sides, after which the spikes are driven through the holes 5 and the device is permanently secured, as well as the nuts, which cannot be rotated, either by accident or otherwise, without removing the device. In addition to holding the nuts against movement my device is so designed and attached in position that it forms a brace for the car-rails and prevents the spreading thereof, thus performing the double function of a nut-lock and rail-brace.

I am aware that nut-locks for the purpose of preventing the nuts upon rail-bolts from being loosened have been heretofore made, and I therefore limit myself to the construction shown.

What I claim as new, and desire to secure by Letters Patent, is—

A nut-lock constructed with a body portion 1 having a plurality of nut-notches 2 in its under side and arms 3 having the spike-holes 5 therethrough integral with said body portion and formed by being bent laterally thereto, the outer edges of said arms being in line with the outer ends of said body portion and the inner edges thereof in line with one of the faces of said nut-notches, substantially as described.

In testimony whereof I affix my signature in presence of two witnesses.

EDWARD J. SISK.

Witnesses:
J. P. DEJON,
GEORGE E. HALL.